US006454647B1

(12) United States Patent
Woodbury, Jr.

(10) Patent No.: US 6,454,647 B1
(45) Date of Patent: Sep. 24, 2002

(54) METHOD AND SYSTEM FOR AUTOMATED COLLECT AND WIN SWEEPSTAKES FOR ATM TRANSACTIONS

(75) Inventor: Robert D. Woodbury, Jr., Flemington, NJ (US)

(73) Assignee: FleetBoston Financial Corporation, Boston, MA (US)

( * ) Notice: Subject to any disclaimer, the term of this patent is extended or adjusted under 35 U.S.C. 154(b) by 0 days.

(21) Appl. No.: 09/338,950

(22) Filed: Jun. 22, 1999

(51) Int. Cl.[7] .............................................. G06F 17/00
(52) U.S. Cl. ......................... 463/16; 463/40; 273/138.1
(58) Field of Search ......................... 273/138 A, 148 B; 463/1, 16–19; 700/91, 92

(56) References Cited

U.S. PATENT DOCUMENTS 3,852,576 A 12/1974 Rudd
4,213,524 A 7/1980 Miyashita et al.
4,669,730 A 6/1987 Small
4,815,741 A * 3/1989 Small ...................... 273/138 A
4,817,949 A * 4/1989 Bachman et al. ........... 273/139
4,854,590 A 8/1989 Jolliff et al.
4,906,826 A * 3/1990 Spencer ...................... 235/379
4,982,346 A 1/1991 Girouard et al.
4,993,714 A 2/1991 Golightly
5,231,568 A 7/1993 Cohen et al.
5,608,785 A 3/1997 Kasday

* cited by examiner

*Primary Examiner*—Joe H. Cheng
*Assistant Examiner*—Julie Brocketti
(74) *Attorney, Agent, or Firm*—Mathews, Collins, Shepherd & McKay, P.A.

(57) ABSTRACT

A method and system for a promotional game for automated transactions in which customer receipts of certain types of transactions are imprinted with a game piece. The game piece is a portion of a game winning sequence or an instant winning sequence. The game pieces are collected to win a prize.

28 Claims, 5 Drawing Sheets

METHOD AND SYSTEM FOR AUTOMATED COLLECT AND WIN SWEEPSTAKES FOR ATM TRANSACTIONS

BACKGROUND OF THE INVENTION

1. Technical Field

This invention relates to a promotional game system for ATM transactions in which customer receipts for certain types of transactions at automated teller machines or point of sale terminals are generated having game piece images printed thereon. The game pieces are collected to win a prize.

2. Background of the Invention

Automated teller machines ("ATMs") whereby bank customers make cash withdrawals, deposits, check account status and other types of transactions are well known. Promotional efforts to encourage the use of ATMs by incorporating promotional games on receipts generated by the ATMs are also known. U.S. Pat. No. 4,815,741 describes an apparatus for automated marketing and gaming in which an identification card is inserted into the device. A user identification, such as a personal identification number (PIN), is inserted by the user to validate access to the user's account. Upon validation, the user's account number is relayed to a sweepstakes processor. The sweepstakes processor generates a random game number. Alternatively, one or more winning account numbers can be pre-selected on a random basis and stored at the sweepstakes processor as the random game number. The account number and random game number are compared to determine if the two numbers match. This patent has the limitation that prizes are awarded only after processing of account numbers to determine a match of the user and pre-selected account number or randomly generated game numbers. This patent also does not provide for prizes awarded based on a type of transaction and for collecting a number of receipts in order to win a prize.

U.S. Pat. No. 4,817,949 describes automated teller machine transaction receipts with an integral promotional game in which game indicia are pre-printed on the reverse side of receipt stock. An opaque masking layer covers the game indicia and can be removed by the customer. The game indicia can be an instant winner or the customer can collect a number of receipts to win a prize. This patent has the shortcoming of printing receipts in advance and does not provide for real time printing of sweepstakes data based on a type of transaction.

Of general relevance are U.S. Pat. Nos. 4,906,826, 5,608,785 and 5,231,568 directed to promotional gaming processors.

It is desirable to provide a simple system to attract customers to use a particular service offered by a financial institution by automatically generating game pieces on receipts of particular ATM transactions which receipts can be collected to win a prize.

SUMMARY OF THE INVENTION

The present invention comprises a method or system for playing a promotional game to induce a customer to use one or more particular services of a financial institution. Game winning sequence indicia are determined and stored in a storage medium. A determination is made as to whether a customer's transaction at a remote interface device, such as an automated teller machine point of sale terminal or the like, qualifies as a transaction type which is included in the promotional game. If it is determined that the customer's transaction is a qualified transaction, a game piece related to a portion of the stored game winning sequence indicia is accessed and the game piece is printed on the customer's receipt. The customer can collect all portions of the game winning sequence indicia to win a prize.

Preferably, the game winning sequence indicia can be stored as a plurality of images at an automated teller machine. An image is stored in a predetermined ratio for each game piece and the images are randomly accessed. A single game piece, related to a portion of the game winning sequence indicia, can be issued once or a select number of times at a predetermined ATM location to increase the odds of collecting all portions of the game winning sequence indicia. Instant winning sequence indicia can also be stored and printed on the customer receipt after a qualified customer's transaction is determined.

The invention will be more fully described by reference to the following drawings.

DETAILED DESCRIPTION

During the course of this description like numbers will be used to identify like elements according to the different figures which illustrate the invention.

Figure 1:
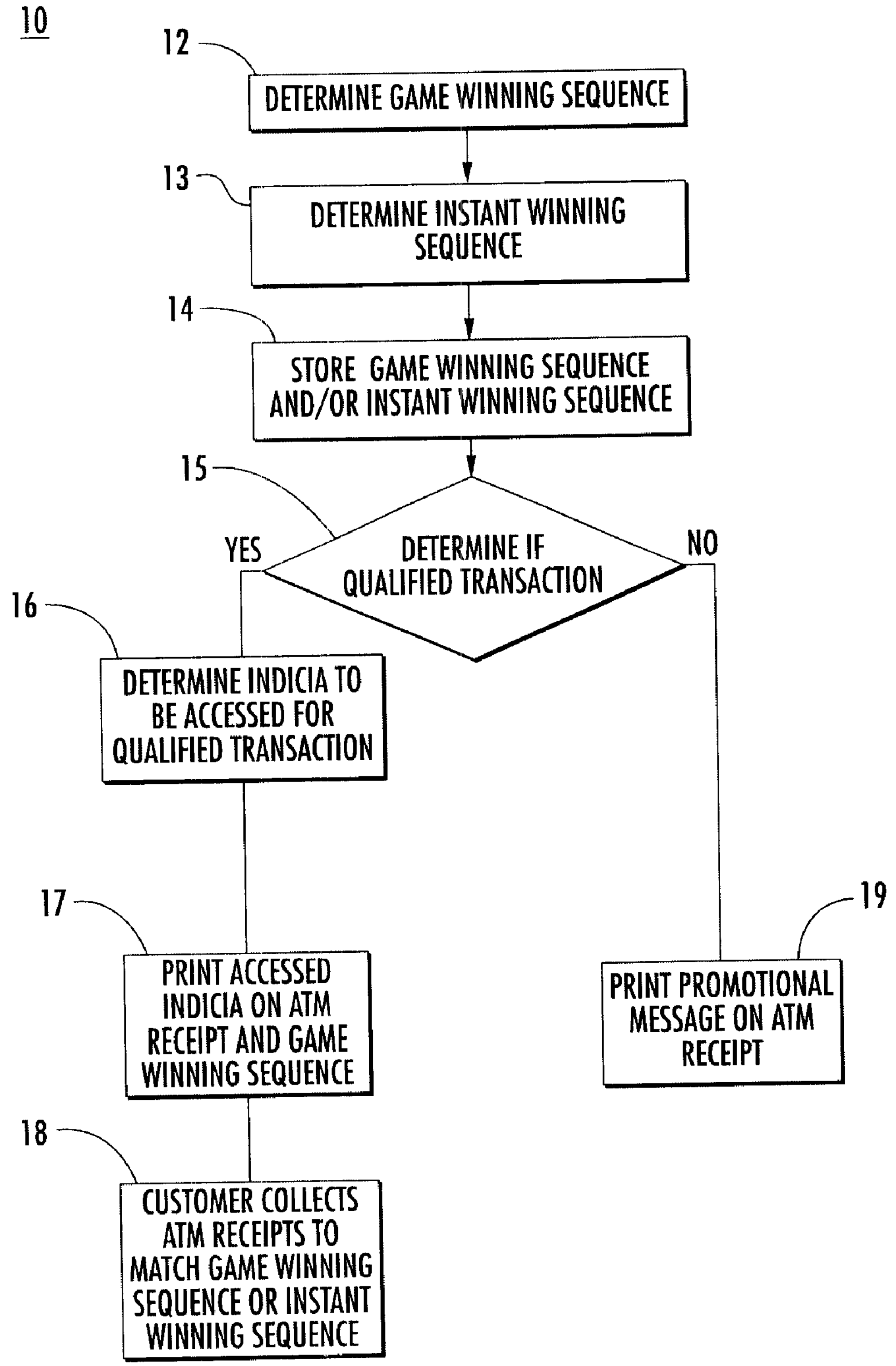
FIG. 1 is a flow diagram of an automated collect and win sweepstakes for ATM transactions in accordance with the teachings of the present invention.

FIG. 1 illustrates a method for an automated collect and win sweepstakes for ATM transactions 10 in accordance with the teachings of the present invention. In block 12, a game winning sequence is determined. For example, the determined game winning sequence can be indicia of a promotional message, such as "Cash in now at your bank ATM" or "Split deposits win at your bank ATM". In certain embodiments, an instant winning sequence is also determined in block 13. For example, the determined instant winning sequence can be indicia, such as "You've won $20". Alternatively, the game winning sequence or instant winning sequence can be one or more pictures or graphic illustrations. It will be appreciated that the game winning sequence can be any number of indicia or graphics to effect the odds of collecting the game winning sequence. For example, the odds of collecting a game winning sequence represented by seven indicia would be greater than a game winning sequence represented by five indicia when each indicia is collected to match the game winning sequence.

The determined game winning sequence indicia and instant winning sequence indicia are stored in block 14. Preferably, an image can be stored for each indicia or combination of indicia in the determined game winning sequence indicia and determined instant winning sequence indicia. For example, an image can be saved for each of the game winning sequence indicia "Cash", "in", "now", "at", "your", "bank" and "ATM". An image could also be saved for the instant winning sequence indicia, such as for example, "You've won $20".

In block 15, a determination is made to decide if a customer entered transaction at the ATM qualifies as a transaction type for the collect and win sweepstakes. For example, it can be predetermined that the type of transactions that qualify for the collect and win sweepstakes are new services or underused services provided by the financial institution. Suitable examples of qualified transactions include new services such as an envelope deposit to a single account of the financial institution, a split deposit to one or more accounts of the financial institution with receipt of cash from the ATM and a check cashed at the ATM. It will be appreciated that any number and type of transactions performed at an ATM can be determined as qualified transactions.

If the customer's transaction qualifies for the collect and win sweepstakes, block 16 is performed to determine stored indicia to be accessed for the transaction, which will be described in more detail below. For example, the stored indicia can be an image stored at the ATM or at a financial institution data processor. In block 17, the accessed indicia is printed on a customer receipt that is generated at the ATM for the transaction. Game winning sequence indicia can also be printed on the customer receipt to make it easy for the customer to identify the game winning sequence. In block 18, a customer collects the ATM receipts to match the game winning sequence or to match the instant winning sequence and win a prize. Prizes can be awarded by the customer presenting the collected game receipts at a particular financial institution. Suitable prizes include cash prizes, material goods or services. In this manner, the customer is encouraged to use the various services of the ATM for future transactions, in the hope of collecting the game winning sequence or collecting the instant winning sequence.

If the customer's transaction does not qualify for the collect and win sweepstakes, promotional indicia is printed on the ATM receipt, in block 19. The promotional indicia can be stored at the ATM or at the financial institution data processor and forwarded to the receipt printer of the ATM after a customer's transaction. For example, the promotional indicia can be a message promoting one or more services of the financial institution that qualify for the collect and win sweepstakes.

Figure 2:
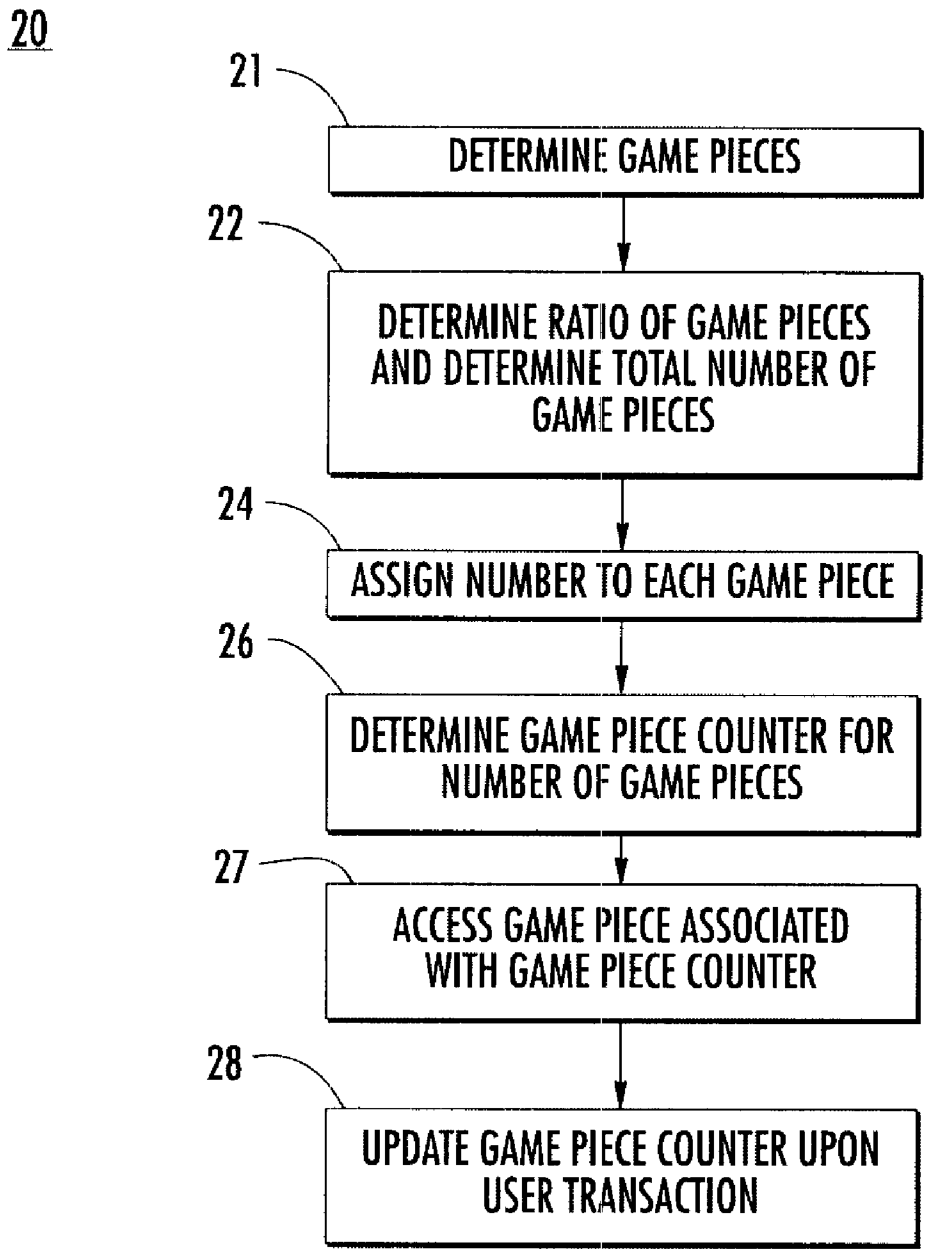
FIG. 2 is a flow diagram of a game piece logic module for determining the ratio of game pieces used in the automated collect and win sweepstakes.

FIG. 2 is a flow diagram of game piece logic module 20 which can be implemented in blocks 12, 14 and 16 of FIG. 1. In block 21, a plurality of game pieces are determined. Accordingly, for the game winning sequence indicia "Cash in now at your bank" four game pieces, Game Piece 1 to Game Piece 5, are used for the indicia "Cash", "in", "now", "at", "your" and one game piece, Game Piece 6, is used for the indicia "bank". Each game piece includes indicia determined and stored for the game winning sequence in blocks 12 and 14. Preferably, each game piece, Game Piece 1 to Game Piece 6, can represent an image determined and stored for each indicia or combination of indicia in the game winning sequence.

In block 22, a ratio of the number of game pieces to be used in the collect and win sweepstakes is determined. Preferably, a smaller ratio of at least one of the game pieces is used in block 22 to provide increased odds for collecting the game winning sequence. For example, in a game winning sequence having seven images associated therewith a ratio of game pieces can be determined as four issuances of five of the game pieces, defined as Game Piece 1 to Game Piece 5, and one issuance of a sixth one of the game pieces, defined as Game Piece 6. The total number of game pieces is determined from the determined ratio of game pieces, such that in the previous example a value of "21" is used as the total number of game pieces used in the collect and win sweepstakes. It will be appreciated that the ratio of game pieces can vary to effect the odds of collecting a game winning sequence.

In block 24, a random number is determined between a game piece lower bound and a game piece upper bound and the random number is assigned to one of the game pieces. The game piece lower bound is typically defined as the value "1" and the game piece upper bound is defined as the total number of game pieces. For example, in the previously described example, using a value of "21" as the total number of game pieces in the collect and win sweepstakes, each game piece is assigned a random number having a value from "1" to "21". Accordingly, as an example, Game piece 1, relating to the indicia "Cash", can be assigned, for example, a random number having a value of "4".

A game piece counter is determined for the total number of game pieces, in block 26. The game piece counter starts at a counter lower bound and is incremented to a counter upper bound. The counter lower bound and counter upper bound typically correspond to the game piece lower bound and the game piece upper bound. In block 27, a game piece having an assigned random number that matches the value of the game piece counter is accessed. In block 28, the game piece counter is incremented to the next value. After the game piece counter reaches the counter upper bound, the counter is reset to the counter lower bound. For example, in a collect and win sweepstakes having a value of "21" as the total number of game pieces, the game piece counter starts a counter lower bound having a value of "1" and is incremented to a counter upper bound having a value of "21" before being reset to the counter lower bound having a value of "1". In this manner, game piece logic module 20 provides random issuance of game pieces in a predetermined ratio.

Figure 3:
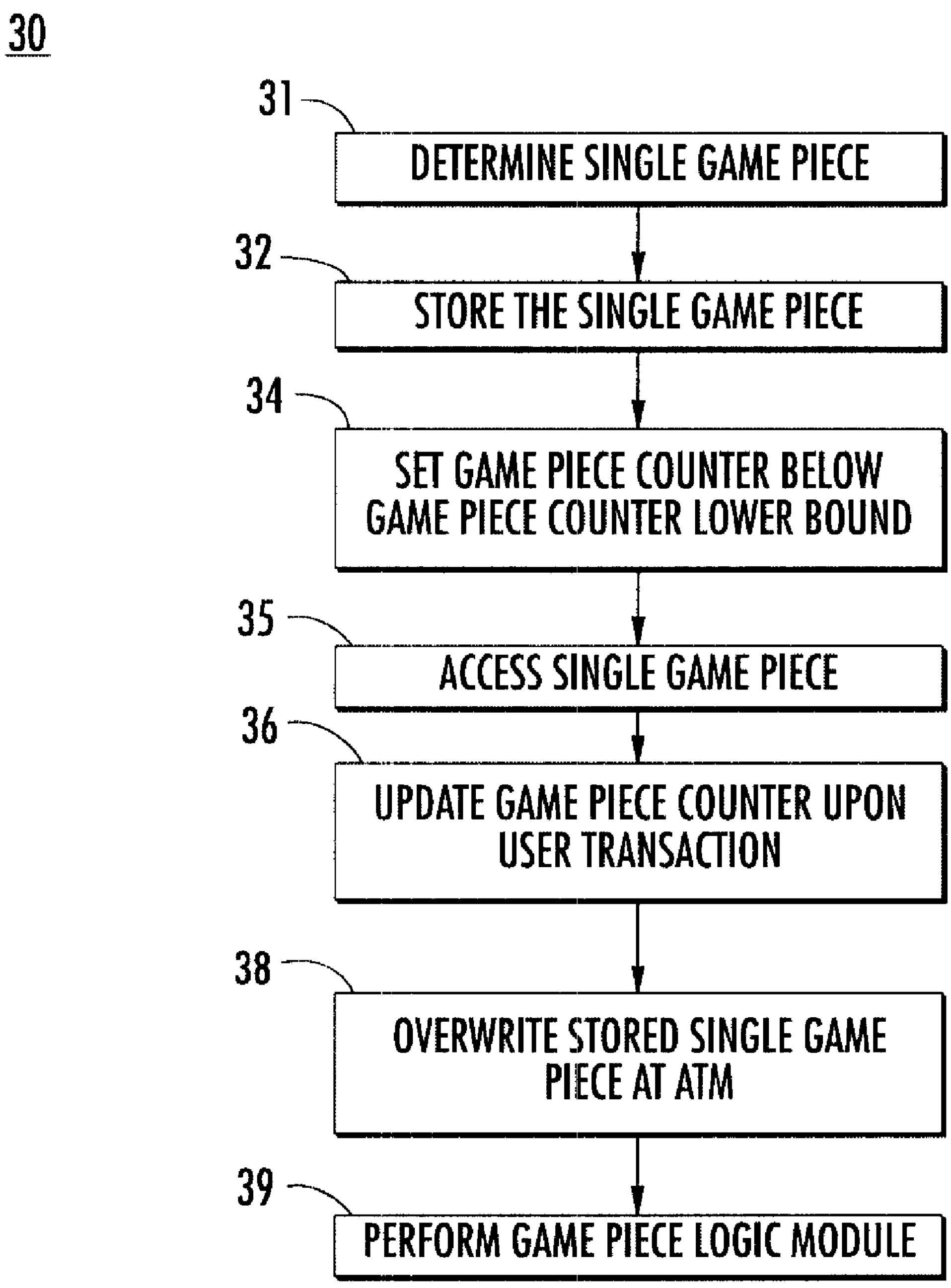
FIG. 3 is a flow diagram of a single game piece logic module that can be used in combination with the game piece logic module.

FIG. 3 illustrates single game piece logic module 30 which can be used in combination with game piece logic module 20 to issue a single game piece related to a portion of the game winning sequence indicia. For example, for a game winning sequence indicia of "Cash in now at your bank ATM" game piece logic module 20 can be used for determining and accessing the portion of the game winning sequence having the indicia "Cash in now at your bank" and single game piece logic module 30 can be used for determining and accessing the portion of the game winning sequence having the indicia "ATM". A single game piece is determined in block 31. The single game piece relates to indicia determined for a portion of the game winning sequence indicia. The single game piece is typically determined to be issued once during the sweepstakes contest at a determined ATM on a particular day. Alternatively, the single game piece can be issued more than once during the contest. For example, after a predetermined amount of time without a winner of the sweepstakes contest.

In block 32, the single game piece is stored, preferably at the predetermined ATM. Alternatively, the single game piece can be stored at a financial institution data processor and forwarded to the ATM for printing on the receipt. Preferably, the single game piece indicia is stored as an image.

In block 34, the game piece counter determined in block 26 is set to a value below the game piece lower bound. For example, if the game piece lower bound is set to a value of "1" the game piece counter is set to a value of "0". In block 35, the stored single game piece is accessed upon execution of a first qualified ATM transaction and is printed on the ATM receipt by implementing block 17 of FIG. 1. After issuance of the single game piece, the game piece counter is incremented to the game piece lower bound, in block 36. In block 38, the stored single game piece is overwritten with indicia in the game winning sequence indicia that is different from the indicia of the single game piece in order to ensure that the single game piece is not erroneously issued again. In block 39, game piece logic module 20, as described above, is performed for subsequent qualified transactions for issuing game pieces.

Figure 4:
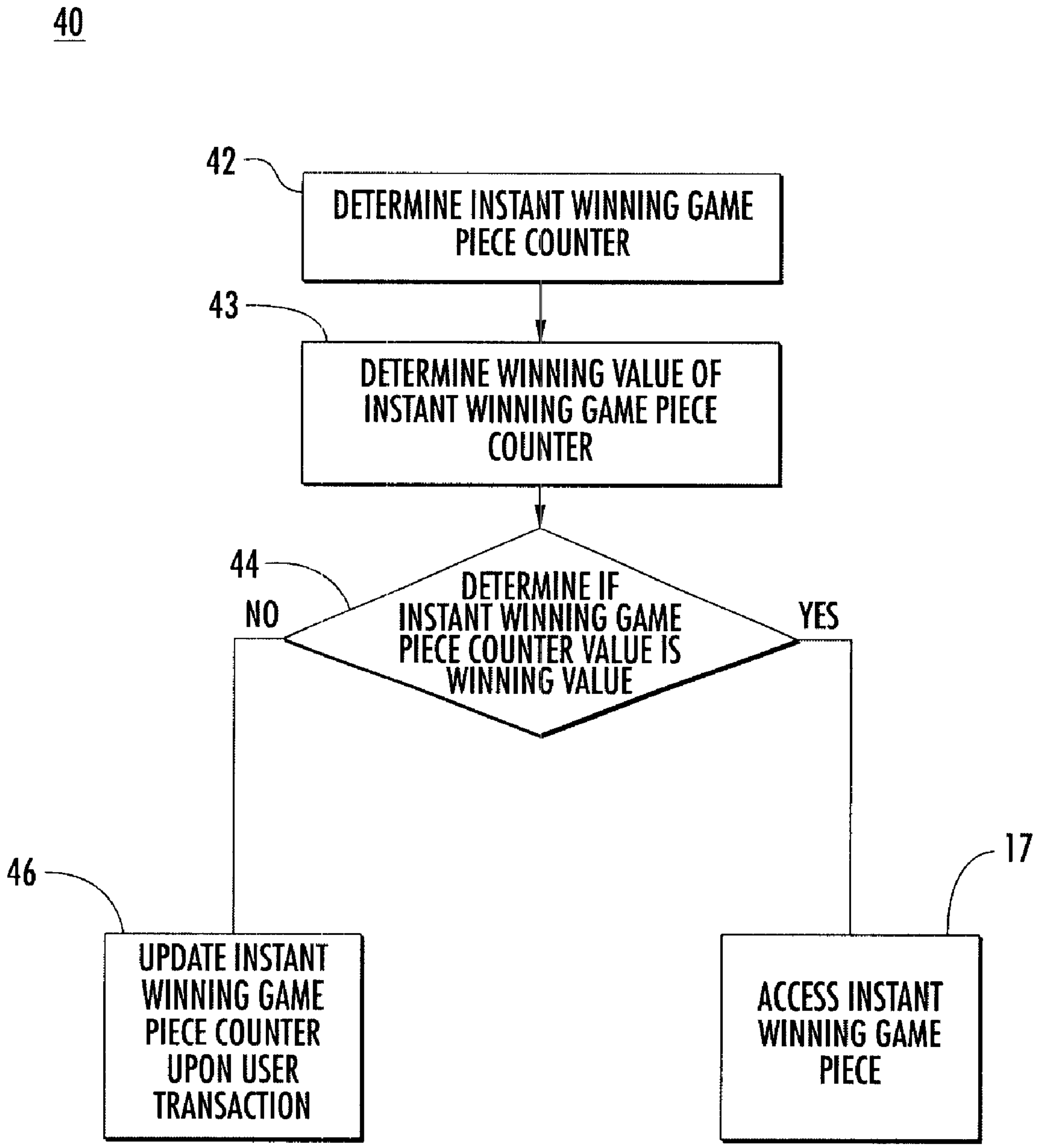
FIG. 4 is a flow diagram of an instant game piece logic module that can be used for issuing an instant winning game piece in the automated collect and win sweepstakes.

FIG. 4 illustrates a flow diagram of instant game piece logic module 40 which can be used in blocks 13, 14 and 16 of FIG. 1 for generating and printing an instant winning sequence on a customer receipt. In block 42, an instant winning game piece counter is determined. For example, the instant winning game piece counter can be a five digit counter for counting between an instant winning game piece counter lower bound having a value of "0" and instant winning game piece counter upper bound having a value of "99,999." Preferably, the instant winning game piece counter can be reset to the instant winning game piece counter lower bound after a pre-determined number of days, i.e. a week. Accordingly, the instant winning game piece is issued once during the predetermined number of days.

A winning value of the instant winning game piece counter is determined, in block 43. For example, a winning value of the instant winning game piece counter can be assigned a value of "7" to ensure that an instant winner is issued at least once during the predetermined number of days, such as a week, since seven ("7") qualified transactions typically occur within a week and not more than 99,999 qualified transactions usually occur within a week. Alternatively, more than one winning value of the instant winning game piece counter can be determined in block 43 to enable more than one instant winning game piece to be issued during a predetermined number of days.

In block 44, it is determined if the instant winning game piece counter matches the determined winning value. If the instant winning game piece counter matches the winning value, the instant winning game piece is accessed, in block 17 to print indicia of the instant winning sequence on the ATM receipt. If the instant winning game piece counter does not match the winning value, the instant winning game piece counter is incremented to the next value, in block 46. If block 46 is performed, a game piece relating to the game winning sequence is accessed according to game piece logic module 20.

Figure 5:
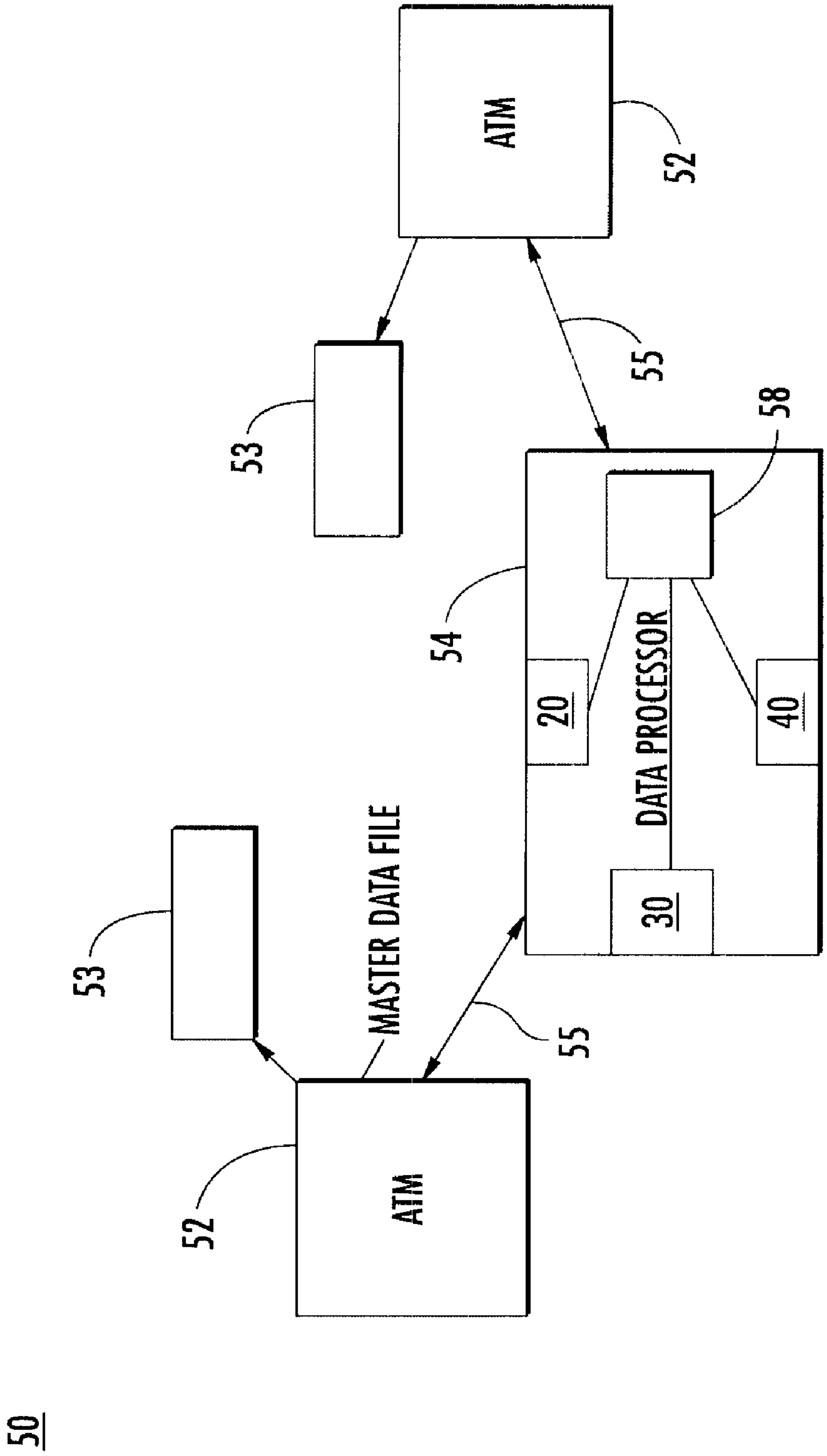
FIG. 5 is a schematic diagram of a system for implementing the automated collect and win sweepstakes.

FIG. 5 illustrates a schematic diagram of system 50 for performing the method for an automated collect and win sweepstakes for ATM transactions 10 described above. At least one ATM 52 electronically communicates with financial institution data processor 54 through ATM network 55. ATM 52 includes a personal computer having a processor, such as an INTEL Pentium Processor, and a storage medium, such as a hard drive. ATM 52 include receipt printer 53. A suitable ATM is manufactured by NCR as 5600 Series ATM. It will be appreciated that ATM 52 can be any remote interface device or conventional ATM. Alternatively, ATM 52 can be a point of sale (POS) terminal located in a retail establishment having a receipt printer 53 attached thereto.

Financial institution data processor 54 can include one or more networked computers. It will be appreciated that ATM network 55 can be used to connect a plurality of ATMs 52, a plurality of financial institution data processors 54 and may include various switches and other conventional components for performing routing of the electronic communications through ATM network 55.

The game winning sequence indicia and instant winning sequence indicia, described above, are preferably stored in storage medium of ATM 52. The game winning sequence indicia and instant winning sequence indicia can be stored as images, thereby the images can be expeditiously accessed by the ATM and printed on the customer receipt. Alternatively, indicia related to the game winning sequence and instant winning sequence are stored in storage medium of financial institution data processor 54 and the images are electronically communicated over ATM network 55 to ATM 52 and the images are printed on the customer receipt. For example, a PCX file can be generated for each indicia or a combination of indicia of the game winning sequence or instant winning sequence. The images of the game winning sequence and the instant winning sequence are preferably stored in the ratio determined in block 22 of FIG. 2. Alternatively, one image for each indicia is stored and a look up table and pointer to the image is used to access the images in the determined ratio. A portion of the game winning sequence indicia related to the single game piece can be stored in the storage medium at a particular ATM 52 at a particular time, as described above.

Preferably, game piece logic module 20, single game piece logic module 30 and instant game piece logic module 40 are implemented by a game processor 58. Game processor 58 also implements blocks 12–17 and 19 of FIG. 1. Alternatively, game processor 58 or some of the functions of game processor 58 can be merged with ATM 52 and implemented in software running thereon. For example, the game piece counter and instant winning game piece counter can be stored and updated at each ATM 52 in ATM network 55. Given the description herein, those skilled in the art will know how to design and program game processor 58.

Financial institution data processor 54 includes conventional software for performing transactions of the financial institution and generating transaction information and instructions for printing receipts at ATM 52 with receipt printer 53. Financial institution processor 54 provides typical information of headings which identify transactional information which is imprinted on the customer receipt by the ATM. The exact location of the transactional information is determined by specifications set by the ATM manufacturer. Game processor 58 cooperates with financial institution data processor 54 to determine a location of the sweepstakes information, such as the accessed game winning sequence indicia, accessed single game winning sequence indicia, and instant winning sequence indicia to be printed on the receipt with the conventional transactional information. For example, the sweepstakes information can be printed on the bottom of a conventional ATM receipt replacing conventional promotional messages. Financial data processor 54 also can store and generate promotional messages to be printed on a customer receipt in block 19 of FIG. 1. Alternatively, game processor 58 provides instructions to ATM 52 for generating a separate customer receipt with the sweepstakes information.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

I claim:

1. A method of playing a promotional game for inducing a customer to use one or more particular services of a financial institution comprising the steps of:

determining game winning sequence indicia;

storing said game winning sequence indicia on a storage medium;

determining whether a customer transaction qualifies as a transaction type of the one or more particular services of the financial institution for the promotional game;

determining indicia to be accessed from said stored game winning sequence indicia upon determining a qualified customer transaction exists to form accessed indicia, said accessed indicia is a portion of said game winning sequence;

printing said accessed indicia on a customer receipt; and collecting a plurality of said customer receipts to match said game winning sequence indicia wherein the step of storing said game winning sequence indicia comprises the steps of:

determining a plurality of game pieces, each said game piece representing an image of a portion of said game winning sequence indicia;

determining a ratio of said plurality of game pieces; and storing said game pieces in said determined ratio.

2. The method of claim 1 further comprising the steps of:

determining promotional indicia to be accessed upon determining said customer transaction does not qualify as said transaction type of the one or more particular services of the institution for the promotional game; and printing said promotional indicia on a customer receipt.

3. The method of claim 2 wherein said promotional indicia describes said one or more particular service of the financial institution for the promotional game.

4. The method of claim 1 wherein said game winning sequence indicia is stored as a plurality of images.

5. The method of claim 4 wherein said accessed indicia comprises one of said plurality of images.

6. The method of claim 1 further comprising the steps of:

collecting a plurality of customers receipts having accessed indicia, and matching said accessed indicia to said game winning sequence indicia from said customer receipts to win a prize.

7. The method of claim 1 wherein at least one of said plurality of game pieces has a smaller ratio than the other ones of said plurality of game pieces.

8. The method of claim 1 further comprising the step of:

printing said game winning sequence indicia on said customer receipt.

9. A plurality of remote interface devices, each remote interface device being in electronic communication with a financial institution data processor and each remote interface device having a storage medium and a receipt printer;

means for storing game winning sequence indicia on said storage medium;

a sweepstakes processor having means for determining whether a customer transaction qualifies as a transaction type of the one or more particular services of the financial institution for the promotional game; means for determining indicia to be accessed from said stored game winning sequence indicia upon determining a qualified customer transaction exists to form accessed indicia; and means for notifying a customer at one of said remote interface devices of said accessed indicia by providing instructions for printing said accessed indicia on a customer receipt at said receipt printer;

means for determining instant winning sequence indicia;

means for storing said instant winning sequence indicia on a storage medium;

means for determining whether said customer transaction qualifies as an instant winner;

means for accessing said stored instant winning sequence indicia upon determining said instant winner exists; and means for printing said accessed winning sequence indicia on a customer receipt.

10. A method of playing a promotional game for inducing a customer to use one or more particular services of a financial institution comprising the steps of:

determining game winning sequence indicia;

storing said game winning sequence indicia on a storage medium;

determining whether a customer transaction qualifies as a transaction type of the one or more particular services of the financial institution for the promotional game;

determining indicia to be accessed from said stored game winning sequence indicia upon determining a qualified customer transaction exists to form accessed indicia;

determining instant winning sequence indicia before said step of determining a game winning sequence;

storing said instant winning sequence indicia on a storage medium;

determining whether said customer transaction qualifies as an instant winner;

accessing said stored instant winning sequence indicia upon determining said instant winner exists; and printing said accessed instant winning sequence indicia on a customer receipt.

11. A method of playing a promotional game for inducing a customer to use one or more particular services of a financial institution comprising the steps of:

determining game winning sequence indicia;

determining a plurality of game pieces, each said game piece representing an image of a portion of said game winning sequence indicia;

determining a ratio of said plurality of game pieces;

storing said game pieces in said determined ratio;

determining whether a customer transaction qualifies as a transaction type of the one or more particular services of the financial institution for the promotional game;

determining indicia to be accessed from said stored game winning sequence indicia upon determining a qualified customer transaction exists to form accessed indicia, wherein the step of determining indicia to be accessed from said stored game winning sequence indicia comprises the steps of:

assigning a number to each of said plurality of game pieces;

determining a game piece counter for counting between a counter lower bound and a counter upper bound, said counter upper bound being the total number of said plurality of game pieces; and accessing a game piece having said assigned number matching said game piece counter; and printing said accessed indicia on a customer receipt.

12. The method of claim 11 further comprising the step of:

updating said game piece counter to a next value between said counter lower bound to said counter upper bound after said step of accessing a game piece having said assigned number matching said game piece counter.

13. The method of claim 12 further comprising the step of:

resetting said game piece counter to said counter lower bound after said game piece counter is updated to said game piece counter upper bound.

14. The method of claim 13 wherein before the step of determining whether a customer transaction qualifies as a transaction type of the one or more particular services of the financial institution further comprising the steps of:

determining a single game piece representing an image of a portion of said game winning sequence indicia that is different than said portion of said game winning indicia determined for said game piece; and storing said single game piece.

15. The method of claim 14 further comprising the step of:

setting said game piece counter to a value less than said counter lower bound;

accessing said stored single game piece; and updating said game piece counter to said game piece counter lower bound.

16. The method of claim 15 further comprising the step of:

overwriting said stored single game piece with one of said game pieces.

17. A system of playing a promotional game for inducing a customer to use one or more- particular services of a financial institution comprising:

means for storing said game winning sequence indicia on a storage medium;

means for determining a plurality of game pieces, each said game piece representing an image of a portion of said game winning sequence indicia;

means for determining a ratio of said plurality of game pieces;

means for storing said game pieces in said determined ratio on said storage medium;

means for determining whether a customer transaction qualifies as a transaction type of the one or more particular services of the financial institution for the promotional game;

means for determining indicia to be accessed from said stored game winning sequence indicia upon determining a qualified customer transaction exists to form accessed indicia, said accessed indicia is a portion of said game winning sequence;

means for collecting a plurality of said customer receipts to match said game winning sequence indicia; and means for printing said accessed indicia on a customer receipt.

18. The system of claim 18 further comprising:

means for determining promotional indicia to be accessed upon determining said customer transaction does not qualify as said transaction type of the one or more particular services of the institution for the promotional game; and means for printing said promotional indicia on a customer receipt.

19. The system of claim 18 wherein said game winning sequence indicia is stored as a plurality of images.

20. The system of claim 19 wherein said accessed indicia comprises one of said plurality of images.

21. The system of claim 17 wherein said means for storing said game winning sequence indicia comprises:

means for determining a plurality of game pieces, each said game piece representing an image of a portion of said game winning sequence indicia;

means for determining a ratio of said plurality of game pieces; and means for storing said game pieces in said determined ratio.

22. The system of claim 21 wherein at least one of said plurality of game pieces has a smaller ratio than the other ones of said plurality of game pieces.

23. The system of claim 17 further comprising:

means for determining a single game piece representing an image of a portion of said game winning sequence indicia that is different than said portion of said game winning indicia determined for said game piece; and means for storing said single game piece.

24. A system of playing a promotional game for inducing a customer to use one or more particular services of a financial institution comprising:

means for determining whether a customer transaction qualifies as a transaction type of the one or more particular services of the financial institution for the promotional game;

means for determining indicia to be accessed from said stored game winning sequence indicia upon determining a qualified customer transaction exists to form accessed indicia;

means for determining a plurality of game pieces, each said game piece representing an image of a portion of said game winning sequence indicia;

means for determining a ratio of said plurality of game pieces;

means for storing said games pieces in said determined ratio;

said means for determining indicia to be accessed from said stored game winning sequence indicia comprises:

means for assigning a number to each of said plurality of game pieces;

means for determining a game piece counter for counting between a counter lower bound and a counter upper bound, said counter upper bound being the total number of said plurality of games pieces; and means for accessing a game piece having said assigned number matching said game piece counter; and means for printing said accessed indicia on a customer receipt.

25. A system of playing a promotional game for inducing a customer to use one or more particular services of a financial institution comprising:

means for storing said game winning sequence indicia on a storage medium;

means for determining whether a customer transaction qualifies as a transaction type of the one or more particular services of the financial institution for the promotional game;

means for determining a single game piece representing an image of a portion of said game winning sequence indicia that is different than said portion of said game winning indicia determined for said game piece;

means for setting said game piece counter to a value less than said counter lower bound;

means for accessing said stored single game piece; and means for updating said game piece counter to said game piece counter lower bound.

26. A system of playing a promotional game for inducing a customer to use one or more particular services of a financial institution comprising:

means for storing said game winning sequence indicia on a storage medium;

means for determining whether a customer transaction qualifies as a transaction type of the one or more particular services of the financial institution for the promotional game;

means for determining indicia to be accessed from said stored game winning sequence indicia upon determining a qualified customer transaction exists to form accessed indicia;

means for determining instant winning sequence indicia;

means for storing said instant winning sequence indicia on a storage medium;

means for determining whether said customer transaction qualifies as an instant winner;

means for accessing said stored instant winning sequence indicia upon determining said instant winner exists; and means for printing said accessed instant winning sequence indicia on a customer receipt.

27. A system for playing a sweepstakes like game comprising:

a plurality of remote interface devices, each remote interface device being in electronic communication with a financial institution data processor and each remote interface device having a storage medium and a receipt printer;

means for storing game winning sequence indicia on said storage medium, said means for storing said game winning sequence indicia comprises:

means for determining a plurality of game pieces, each said game piece representing an image of a portion of said game winning sequence indicia;

means for determining a ratio of said plurality of game pieces;

means for storing said game pieces in said determined ratio; and a sweepstakes processor having means for determining whether a customer transaction qualifies as a transaction type of the one or more particular services of the financial institution for the promotional game; means for determining indicia to be accessed from said stored game winning sequence indicia upon determining a qualified customer transaction exists to form accessed indicia; and means for notifying a customer at one of said remote interface devices of said accessed indicia by providing instructions for printing said accessed indicia on a customer receipt at said receipt printer.

28. The system of claim 27 further comprising:

means for determining a single game piece representing an image of a portion of said game winning sequence indicia that is different than said portion of said game winning indicia determined for said game piece; and means for storing said single game piece.

* * * * *